United States Patent
Yagi

(10) Patent No.: US 9,274,788 B2
(45) Date of Patent: Mar. 1, 2016

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yuichi Yagi, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/314,789

(22) Filed: Jun. 25, 2014

(65) Prior Publication Data

US 2015/0007161 A1    Jan. 1, 2015

(30) Foreign Application Priority Data

Jun. 27, 2013    (JP) ................... 2013-135563

(51) Int. Cl.
  *G06F 9/44* (2006.01)
  *G06F 9/445* (2006.01)

(52) U.S. Cl.
  CPC ....... *G06F 8/665* (2013.01); *G06F 8/65* (2013.01); *G06F 8/67* (2013.01); *G06F 8/61* (2013.01); *G06F 8/68* (2013.01)

(58) Field of Classification Search
  CPC ............... G06F 8/60; G06F 8/61; G06F 8/65; G06F 8/67; G06F 8/68
  See application file for complete search history.

(56) References Cited

U.S. PATENT DOCUMENTS

| | | | |
|---|---|---|---|
| 7,669,197 B1 * | 2/2010 | O'Neill et al. ................ | 717/172 |
| 7,730,326 B2 * | 6/2010 | Girish et al. ................. | 713/191 |
| 8,009,499 B2 * | 8/2011 | Reuter et al. ................ | 365/226 |
| 8,868,796 B1 * | 10/2014 | Wojcik et al. ................ | 710/8 |
| 2005/0245227 A1 | 11/2005 | Nohno et al. | |
| 2006/0236325 A1 * | 10/2006 | Rao et al. .................... | 719/315 |

(Continued)

FOREIGN PATENT DOCUMENTS

JP    2003-271464 A    9/2003

OTHER PUBLICATIONS

Jurkovié et al., "Remote Firmware Update for Constrained Embedded Systems", 2014 IEEE, MIPRO 2014, May 26-30, 2014, Opatija, Croatia, pp. 1019-1023; <http://ieeexplore.ieee.org/stamp/stamp.jsp?tp=&arnumber=6859718>.*

(Continued)

*Primary Examiner* — Thuy Dao
*Assistant Examiner* — Ben C Wang
(74) *Attorney, Agent, or Firm* — Rossi, Kimms & McDowell LLP

(57) ABSTRACT

As methods for updating firmware, an information processing apparatus executes a first update method of acquiring update firmware from an external apparatus via a network, storing the acquired update firmware in a volatile memory, and updating the firmware of the information processing apparatus based on the stored update firmware, and a second update method of updating the firmware of the information processing apparatus using a method that is different from the first update method. Furthermore, based on the remaining amount of a battery, the information processing apparatus decides whether to permit both the update of the firmware using the first update method and the update of the firmware using the second update method, or to permit the update of the firmware using the second update method and not to permit the update of the firmware using the first update method.

9 Claims, 5 Drawing Sheets

(56) References Cited

U.S. PATENT DOCUMENTS

| | | | |
|---|---|---|---|
| 2010/0079793 A1* | 4/2010 | Nishikawa | 358/1.15 |
| 2010/0235822 A1* | 9/2010 | Jamerson | 717/168 |
| 2011/0231834 A1* | 9/2011 | Kim | 717/173 |
| 2011/0276958 A1* | 11/2011 | Nishikawa | 717/173 |
| 2012/0179884 A1* | 7/2012 | Araki et al. | 711/159 |
| 2012/0180034 A1* | 7/2012 | Hatamoto et al. | 717/168 |
| 2012/0212063 A1* | 8/2012 | Terlizzi | 307/80 |
| 2012/0272084 A1* | 10/2012 | Tsuji | 713/324 |
| 2013/0179870 A1* | 7/2013 | Kelso et al. | 717/169 |
| 2014/0047432 A1* | 2/2014 | Michishita | 717/173 |
| 2014/0115572 A1* | 4/2014 | Michishita | 717/168 |
| 2014/0325496 A1* | 10/2014 | Son | 717/168 |

OTHER PUBLICATIONS

Kim et al., "Energy-Efficient Progressive Remote Update for Flash-Based Firmware of Networked Embedded Systems", ACM, Nov. 2010; vol. 16, Issue 1, Article No. 7, pp. 7:1-7:26; <http://dl.acm.org/citation.cfm?id=1870109.1870116&coll=DL&dl=GUIDE&CFID=553294674&CFTOKEN=61144264>.*

Texas Instruments, "USB Field Firmware Updates on MSP430 MCUs", Texas Instruments, SLAA452C, Nov. 2014; pp. 1-23; <http://www.ti.com/lit/an/slaa452c/slaa452c.pdf>.*

* cited by examiner

INFORMATION PROCESSING APPARATUS, METHOD FOR CONTROLLING THE SAME, AND STORAGE MEDIUM

BACKGROUND OF THE INVENTION

1. Field of the Invention

The present invention relates to an information processing apparatus that updates firmware, a method for controlling the same, and a storage medium.

2. Description of the Related Art

In current information processing apparatuses, it is possible to temporarily store firmware downloaded directly from a server and perform an update. These kinds of information processing apparatuses are provided with a flash memory that stores programs and setting data, and a random access memory that temporarily stores firmware to be used in updating. Also, the flash memory stores a main program and a firmware update program that reads out firmware from the random access memory (RAM), deletes a program stored in the flash memory, and performs writing control. Japanese Patent Laid-Open No. 2003-271464 discloses a technique in which the charging status of a battery supplying power to a main body and a RAM is checked, and if there is insufficient charge, an update is not performed in order to ensure that the re-writing of the memory is performed completely without being interrupted partway through.

Also, in recent years, as tablet terminals, smartphones, and the like have become widely used, firmware has been updated by information processing apparatuses directly communicating with servers via the Internet for users who do not have personal computers. For this reason, information processing apparatuses have been equipped with two functions, namely a method of updating firmware using a dedicated application that operates with a personal computer, and a method of performing updating using firmware downloaded directly from a server.

However, the following problem is present in the above-described conventional technology. With the method of updating firmware using a dedicated application that operates with a personal computer, it is possible to resume the re-writing of the memory even if the re-writing of the memory is interrupted partway through. On the other hand, in the case where firmware that was downloaded from a server is stored in a volatile memory, if the power source is interrupted and there is insufficient charge in the back-up power source, the downloaded firmware will be lost. Furthermore, since the apparatus is started up in a firmware update mode, the firmware cannot be re-acquired by accessing the server. Accordingly, the firmware update cannot be resumed when the power source is restored. In other words, depending on the method for updating (acquiring) the firmware that is to be used in updating, it is either possible or not possible to resume the re-writing of the memory even if the re-writing of the memory is interrupted partway through. Accordingly, it is not effective to check the charging status of the backup power source in all cases.

SUMMARY OF THE INVENTION

The present invention enables realization of a mechanism for checking the charging status of a back-up power source as necessary in accordance with the method for updating firmware.

One aspect of the present invention provides an information processing apparatus capable of communicating with an external apparatus via a network, the information processing apparatus comprising: a volatile memory; a battery configured to supply power to the volatile memory; an update unit configured to execute a first update method of acquiring an update firmware from the external apparatus via the network, storing the acquired update firmware in the volatile memory, and updating a firmware of the information processing apparatus based on the stored update firmware, and a second update method of updating the firmware of the information processing apparatus using a method that is different from the first update method; and a deciding unit configured to, based on a remaining amount of the battery, decide whether to permit both the update of the firmware using the first update method and the update of the firmware using the second update method, or to permit the update of the firmware using the second update method and not to permit the update of the firmware using the first update method.

Another aspect of the present invention provides a method for controlling an information processing apparatus that is capable of communicating with an external apparatus via a network and includes a volatile memory and a battery that supplies power to the volatile memory, the method comprising: performing updating by executing a first update method of acquiring an update firmware from the external apparatus via the network, storing the acquired update firmware in the volatile memory, and updating a firmware of the information processing apparatus based on the stored update firmware, and a second update method of updating the firmware of the information processing apparatus using a method that is different from the first update method; and deciding, based on a remaining amount of the battery, whether to permit both the update of the firmware using the first update method and the update of the firmware using the second update method, or to permit the update of the firmware using the second update method and not to permit the update of the firmware using the first update method.

Further features of the present invention will be apparent from the following description of exemplary embodiments with reference to the attached drawings.

DESCRIPTION OF THE EMBODIMENTS

Figure 1:
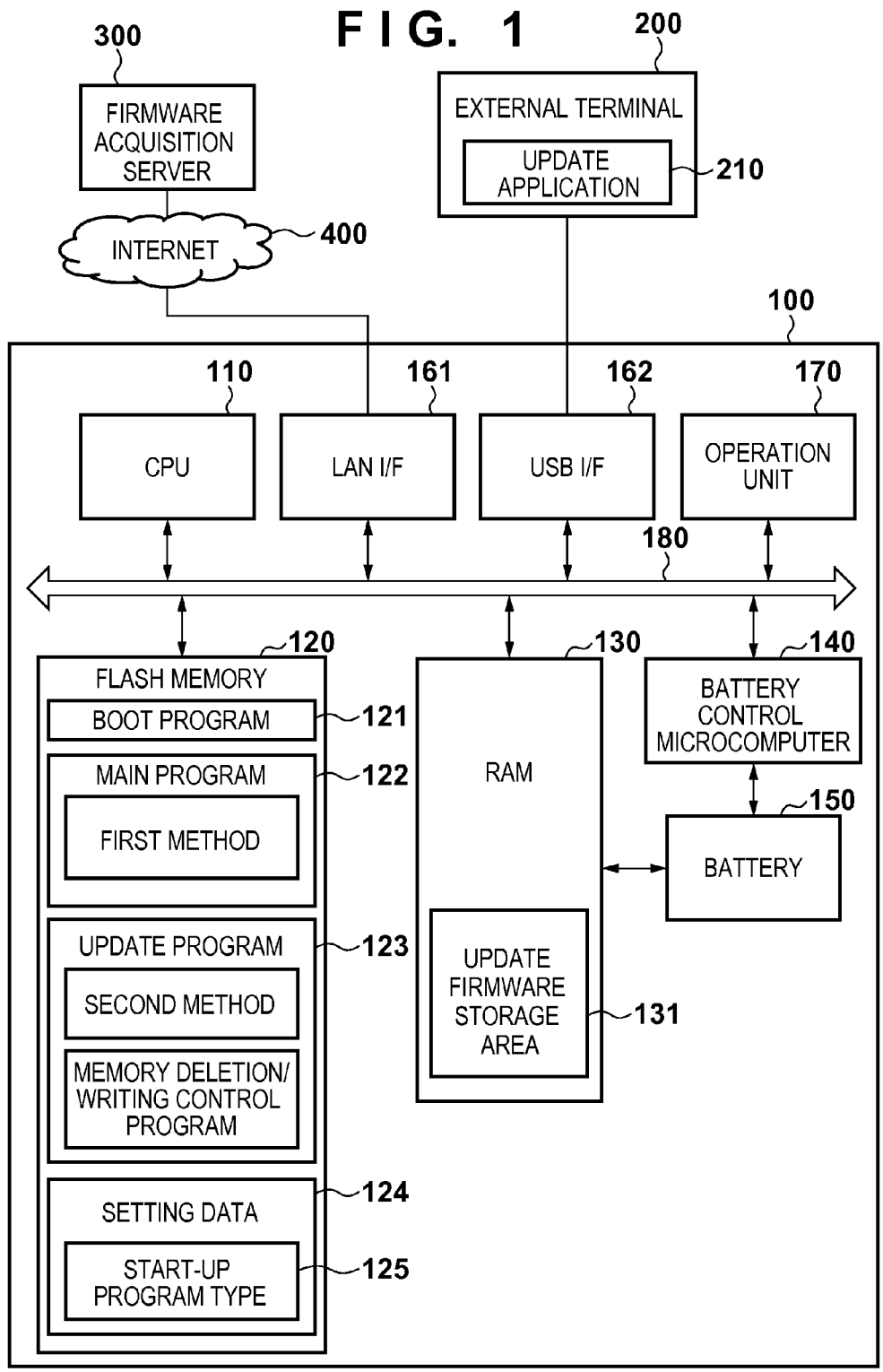
FIG. 1 is a block diagram showing an example of a configuration of an information processing apparatus according to an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Information Processing Apparatus

An embodiment of the present invention will be described below with reference to FIGS. 1 to 5. An example of a configuration of an information processing apparatus that is used in the present invention will be described first with reference to FIG. 1.

An information processing apparatus 100 includes a CPU 110, a flash memory 120, a RAM 130, a battery control microcomputer 140, a battery 150, a LAN I/F 161, a USB I/F 162, and an operation unit 170. The blocks of the information processing apparatus 100 are connected by a system bus 180. The CPU 110 controls the blocks in accordance with programs stored in the flash memory 120.

The flash memory 120, which is a non-volatile memory, stores a boot program 121 that is first started up after a power source is switched on, and a main program 122 that controls the main functions of the information processing apparatus 100. The flash memory 120 furthermore stores an update program 123 that controls firmware updates, and setting data 124. The setting data 124 stores a setting value 125 for the type of the program started by the boot program 121. The RAM 130 is a volatile memory in which the CPU 110 stores temporary data. An update firmware storage area 131 in the RAM 130 is a region for storing update firmware. Note that the update firmware storage area 131 can also be used to store other data as well.

The battery control microcomputer 140 controls the charging of the battery 150, which is a backup power source, and controls a function of acquiring charge capacity in the CPU 110. The battery 150 supplies power for storing data to the RAM 130 when the power source of the information processing apparatus 100 is interrupted. In other words, even if the power source of the information processing apparatus 100 is cut off, the data stored in the RAM 130 is held while power is being supplied from the battery 150.

The LAN I/F 161 performs communication with a firmware acquisition server 300 via a wired LAN. Note that the information processing apparatus 100 may be connected to the firmware acquisition server 300 via a wireless LAN. The USB I/F 162 uses a USB cable to perform communication with an external terminal 200, which is an external apparatus such as a PC that is connected to the information processing apparatus 100. The operation unit 170 receives operations from a user and relays the content thereof to the CPU 110. Also, the operation unit 170 performs screen display based on an instruction from the CPU 110.

The external terminal 200 can execute an update application 210 that includes update firmware for the information processing apparatus 100 and a control program for communicating with the information processing apparatus 100. In this case, an update program in the information processing apparatus 100 updates the firmware based on an instruction from the update application executed by the external terminal 200. Note that the external terminal 200 acquires the update firmware in advance from the website of a vendor or the like and stores it.

The firmware acquisition server 300 is a server managed by the manufacturer of the information processing apparatus 100 or an administrator. The information processing apparatus 100 can acquire the update firmware by connecting to the firmware acquisition server 300 via the Internet 400 or the like. The main program 122 includes a program for executing a first method according to which firmware is acquired from the firmware acquisition server 300 and stored in a firmware storage area, and then firmware updating is performed. Also, the update program 123 includes a program for executing a second method according to which firmware updating is performed using update firmware that was acquired from the update application 210 and is stored in the firmware storage area. The update program 123 only has minimum required functions and can perform USB communication, but cannot perform Internet communication. This is because the update program 123 does not have the functions necessary for Internet communication, such as encrypted communication or proxy authentication. Accordingly, when starting up with the update program 123, it is possible to communicate with the external terminal 200 connected by the USB cable, but it is not possible to communicate with the firmware acquisition server 300 via the Internet. Accordingly, the update program 123 executes an update using firmware acquired with the first method, or executes the second method to acquire the firmware and execute an update using the acquired firmware. In other words, the update program 123 is composed of a program for executing the second method and a program for updating firmware.

Note that the information processing apparatus 100 has a normal operating mode for starting up using the main program 122, and a firmware update mode for starting up using the update program 123. As described above, in the case of operating in the firmware update mode, the information processing apparatus 100 cannot communicate with servers on the Internet but can communicate with the external terminal 200.

Also, in the present embodiment, the programs and the setting data 124 are stored in the same flash memory, but it goes without saying that the present invention can be applied to the case of storing them in separate flash memories as well. In the present embodiment, the main program 122 is handled as firmware that is to be re-written, but it goes without saying that the present invention can be applied to the case of including the setting data 124 in the firmware that is to be re-written as well.

Firmware Update Ability Determination

Firmware update ability determination performed by the CPU 110 will be described next. In the firmware update ability determination, first, the charging status checking result is acquired from the charging status checking unit that checks the charging status of the battery 150 via the battery control microcomputer 140. Based on the acquired checking result, the CPU 110 checks whether or not the charging of the battery 150 has continued for a predetermined amount of time (e.g., 10 minutes), or whether or not the battery remaining amount is larger than a predetermined value (threshold), and determines whether or not a firmware update can be performed.

Here, a firmware update according to the first method will be described. In the first method, upon receiving an instruction from the user via the operation unit 170 to update firmware using the first method, the CPU 110 performs a firmware update ability determination. If the determination result is that a firmware update can be performed, the CPU 110 acquires firmware from the firmware acquisition server 300 via the Internet by means of the LAN I/F 161 and stores the update firmware in the update firmware storage area 131. After the update firmware is stored, the start-up program type is set to the update program, and the information processing apparatus 100 is restarted in the firmware update mode. If the determination result is that a firmware update cannot be performed, the CPU 110 displays a message on the operation unit 170 indicating that a firmware update cannot be performed.

Upon starting up the update program, the CPU 110 first confirms that the update firmware is stored in the update firmware storage area 131. Next, the CPU 110 deletes the data in the region for the main program 122. After the deletion, the stored update firmware is written in the region for the main program 122. When the writing is complete, the start-up program type is set to the main program, and the information processing apparatus 100 is restarted.

In the first method, even if the power source is cut off and once again switched on while the main program is being deleted or after the main program is deleted, power for storing data in the RAM 130 is supplied from the battery 150. Accordingly, the update firmware that is stored in the update firmware storage area 131 remains there. Because of this, it is possible to resume the update from the deletion of the main program.

A firmware update according to the second method will be described next. First, in the second method, upon receiving an instruction from the user via the operation unit 170 to update firmware using the second method, the CPU 110 sets the start-up program type to the update program and restarts the information processing apparatus 100 in the firmware update mode.

Upon starting up the update program, the CPU 110 first acquires the firmware by communicating with the firmware update application 210 in the external terminal 200 via the USB I/F 162 and stores the acquired firmware in the update firmware storage area 131. As described above, the external terminal 200 is connected to the information processing apparatus 100 by the USB cable. Next, the CPU 110 deletes the data in the region for the main program 122. After the deletion, the CPU 110 writes the stored update firmware in the region for the main program 122. After the writing is complete, the start-up program type is set to the main program and the information processing apparatus 100 is restarted in the normal operating mode.

With the second method, if the power source is cut off and once again switched on while the main program is being deleted or after the main program is deleted, the procedure is resumed from acquiring the firmware by communicating with the firmware update application 210.

If the power source is cut off and then the power source is once again switched on while the main program is being deleted or after the deletion in this way, the firmware cannot be acquired directly from the firmware acquisition server 300. This is because the type of program to be started by the information processing apparatus 100 is set to the update program, and with this setting, the firmware cannot be re-acquired by accessing the server. On the other hand, the firmware can be acquired via the update application in the external terminal 200 such as a PC. Accordingly, in the case where the power source is cut off and then switched on again while the main program is being deleted or after the main program is deleted, the firmware update will be performed either normally or not, depending on the firmware update method (first method, second method). With consideration given to the differences in these acquisition methods, the present invention performs control for checking the charging status of the backup battery only in the case of the first method. A specific procedure of processing will be described below.

Processing According to Boot Program

Figure 2:
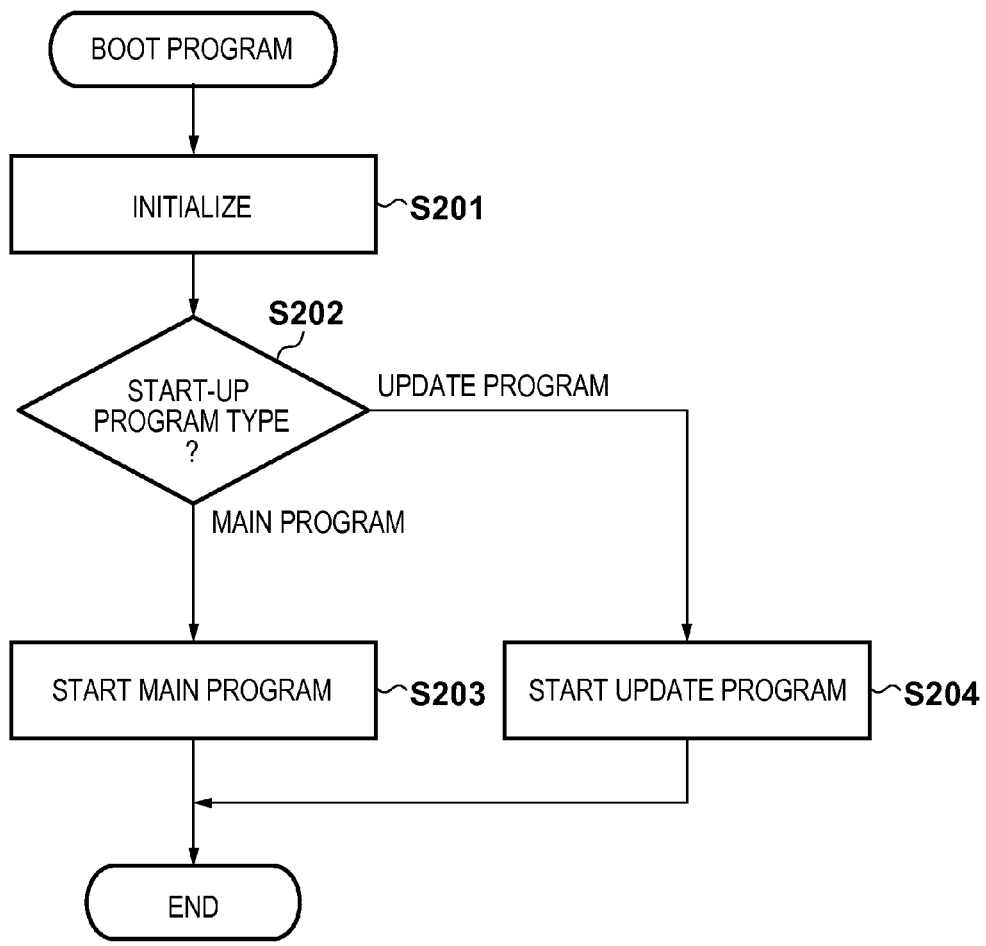
FIG. 2 is a flowchart for a boot program 121 according to the embodiment.

A procedure of processing according to the boot program 121 for carrying out the present invention will be described next with reference to FIG. 2. The processing described below is realized by the CPU 110 reading out the boot program 121 in the flash memory 120 to the RAM 130 and executing it.

In step S201, the CPU 110 initializes the blocks of the information processing apparatus 100. Next, in step S202, the CPU 110 checks the setting value 125 of the start-up program type. If the main program has been set as the startup program type, the procedure moves to step S203, and if the update program has been set, the program moves to step S204.

In step S203, the CPU 110 reads out the main program 122 to the RAM 130, starts up the information processing apparatus 100 in the normal operating mode, and the flowchart ends. Note that the processing for the main program will be described later with reference to FIG. 3. On the other hand, in step S204, the CPU 110 reads out the update program 123, starts up the information processing apparatus 100 in the firmware update mode, and the flowchart ends. Note that the processing performed by the update program will be described later with reference to FIG. 4.

Processing According to Main Program

Figure 3:
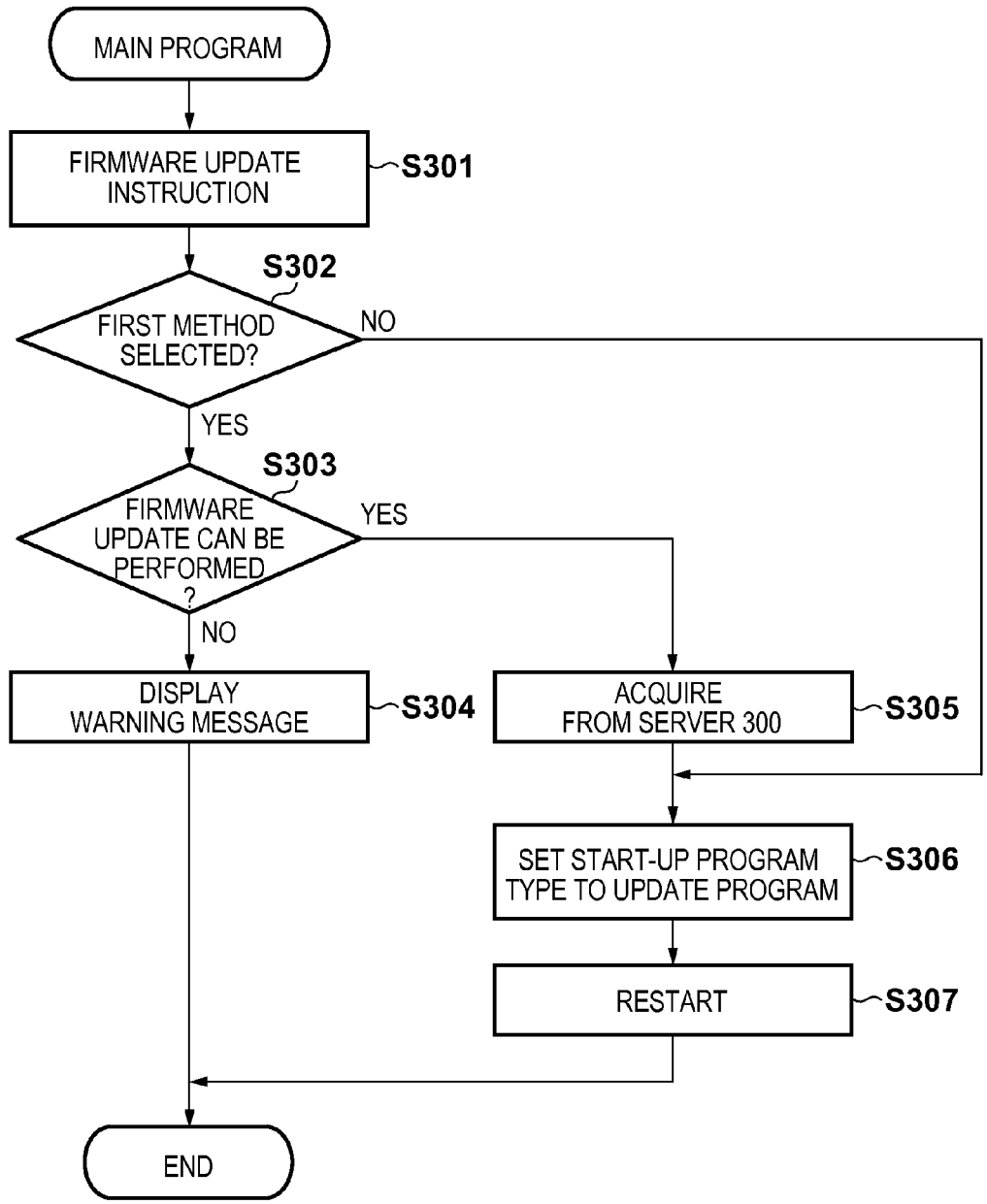
FIG. 3 is a flowchart for a main program 122 according to the embodiment.

A procedure of processing according to the main program 122 for carrying out the present invention will be described next with reference to FIG. 3. The processing described below is realized by the CPU 110 reading out the main program 122 in the flash memory 120 to the RAM 130 and executing it.

In step S301, the CPU 110 receives a firmware update instruction via the operation unit 170. Next, in step S302, the CPU 110 checks whether or not the update instruction received in step S301 corresponds to the first method. If the update instruction corresponds to the first method, the procedure moves to step S303, and if it corresponds to the second method, the procedure moves to step S306.

In step S303, the CPU 110 performs a firmware update ability determination. If the determination result is that the firmware update can be performed, the procedure moves to step S305, and if not, the procedure moves to step S304. For example, the CPU 110 checks the remaining amount in the battery 150 using the battery control microcomputer 140 and determines whether or not the battery remaining amount is at or below a threshold. Also, as described above, the determination may be performed using the amount of charge time. If the battery remaining amount is at or below the threshold, it is determined that the firmware update cannot be performed, and if the battery remaining amount exceeds the threshold, it is determined that the firmware update can be performed. In step S304, the CPU 110 displays a warning message (530) indicating that the firmware cannot be updated since the charge (remaining amount) of the battery 150 is insufficient, or the like on the operation unit 170, and the flowchart ends. In this way, the information processing apparatus 100 prohibits the firmware update by means of the first method until the battery remaining amount is sufficient.

On the other hand, in step S305, the CPU 110 acquires the update firmware from the firmware acquisition server 300 according to the first method and stores the acquired update firmware in the update firmware storage area 131. Next, the CPU 110 sets the start-up program type to the update program in step S306, and restarts the information processing apparatus in the firmware update mode in step S307, and the flowchart ends. Note that if it is determined in step S302 that the second method is to be used, a transition to the firmware update mode is made without checking the battery remaining amount. In other words, even if the battery remaining amount is low, a transition to the firmware update mode is made. Upon transitioning to the firmware update mode, the update firmware is acquired from the external terminal 200.

Processing According to Update Program

Figure 4:
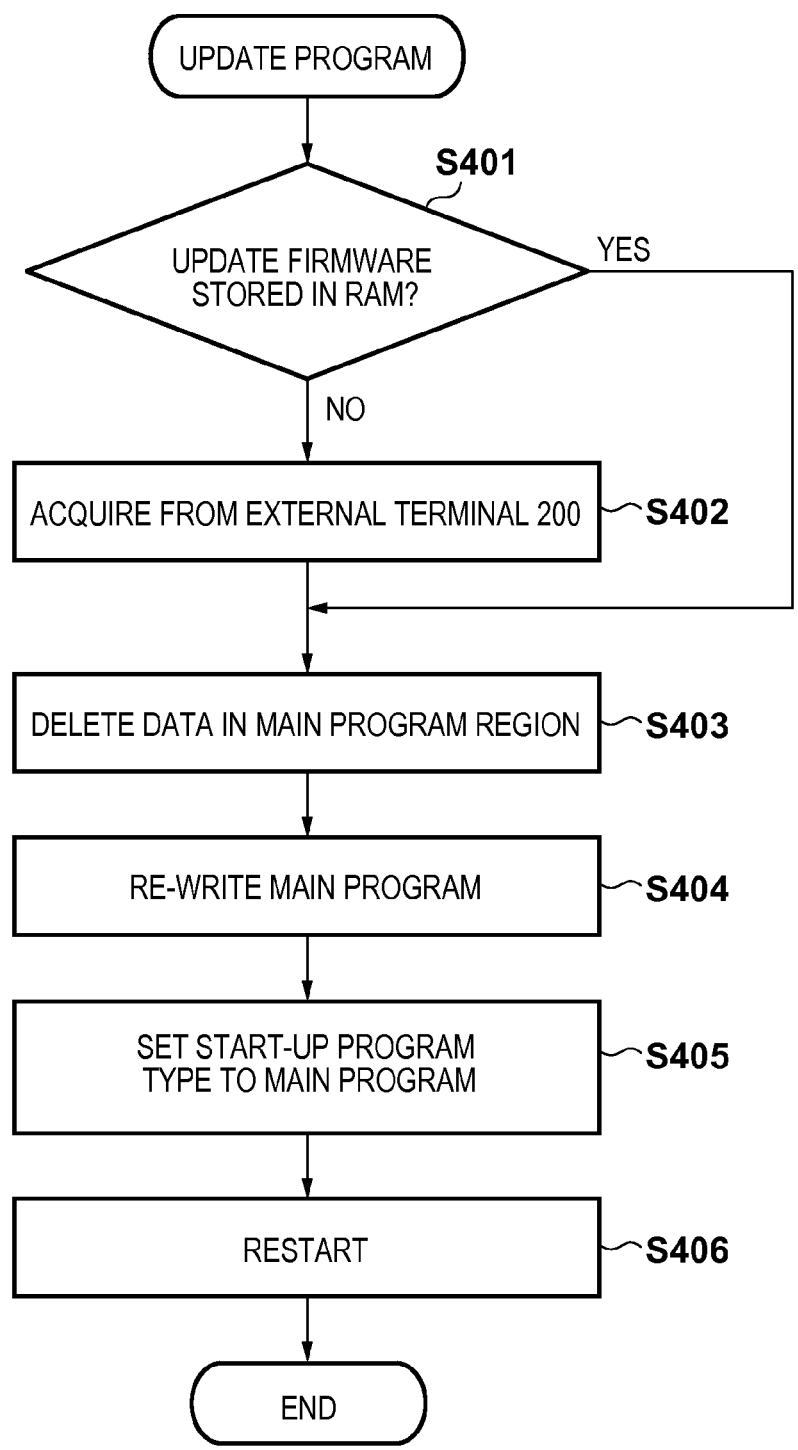
FIG. 4 is a flowchart for an update program 123 according to the embodiment.

A procedure of processing according to the update program 123 for carrying out the present invention will be described next with reference to FIG. 4. The processing described below is realized by the CPU 110 reading out the update program 123 in the flash memory 120 to the RAM 130 and executing it.

In step S401, the CPU 110 checks whether or not the update firmware has been stored in the update firmware storage area 131. If it has been stored, the procedure moves to step S403, and if not, the procedure moves to step S402. In step S402, the CPU 110 uses the second method to acquire the update firmware from the update application 210 of the external terminal 200 via the USB cable, stores the update firmware in the update firmware storage area 131, and moves to step S403.

In step S403, the CPU 110 deletes the data in the region for the main program 122. Next, in step S404, the firmware that was stored in the update firmware storage area 131 is written in the region for the main program 122 by the CPU 110. In step S405, the CPU 110 sets the start-up program type to the main program. In step S406, the CPU 110 restarts the information processing apparatus 100 and the flowchart ends.

Display Screen Example

Figure 5:
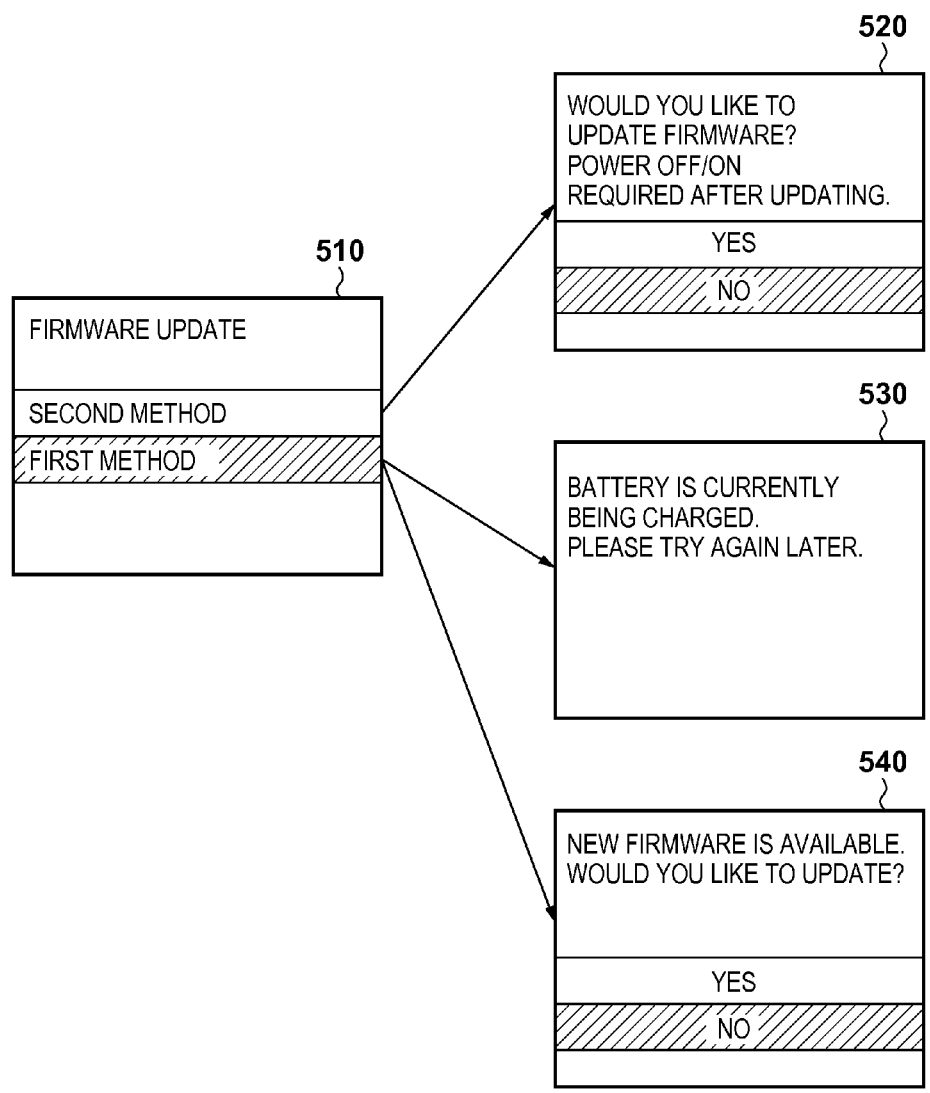
FIG. 5 is a diagram showing a display screen of the information processing apparatus according to the embodiment.

An example of display screens of the information processing apparatus 100 according to the present embodiment will be described next with reference to FIG. 5. The CPU 110 displays display screens 510 to 540 on the display unit of the operation screen 170 based on operations from the operation unit 170.

The screen 510 is a screen that allows the CPU 110 to receive the selection of the firmware acquisition source via the operation unit 170 in step S301. Here, the above-described first method and second method can be selected. Note that the present invention is not limited to this, and the acquisition of firmware according to another method may be selected.

The screen 520 is a screen for selecting whether or not to acquire the firmware using the second method and perform the update (flow moving from step S302 to step S306). The screen 530 is a screen for displaying the warning message in step S304 in the case where the charge of the battery 150 is insufficient. The screen 540 is a screen for selecting whether or not to acquire the firmware using the first method and perform the update (flow moving from step S303 to step S305).

As described above, the information processing apparatus 100 has a first method of acquiring the firmware that is to be used in updating by accessing the firmware acquisition server 300 via the Internet, and a second method of acquiring the firmware from the external terminal 200 that has already stored the firmware. Also, the information processing apparatus 100 includes the update firmware storage area 131 that stores the acquired firmware, and the battery 150 that supplies power to the update firmware storage area 131 storing the firmware in the case where the power source of the information processing apparatus 100 is cut off. Furthermore, upon determining that the firmware is to be acquired using the first method, the information processing apparatus 100 checks the charging status of the battery 150, and if the result of the checking is that the charge is sufficient, the firmware is acquired using the first method and stored in the update firmware storage area 131. On the other hand, if the charge is insufficient, the CPU 110 causes a warning message to be displayed on the display unit without acquiring the firmware. In this way, the information processing apparatus 100 according to the present embodiment determines the method for acquiring the firmware, and only in the case where it is necessary to ensure that the re-writing of the memory is performed completely, checks the charging status of the battery 150 in order to determine whether or not the firmware update can be performed. According to this, it is possible to prevent needless processing such as checking the charging status of the battery 150 even when power does not need to be supplied to the RAM 130 by a backup power source when the power source is interrupted.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-135563 filed on Jun. 27, 2013, which is hereby incorporated by reference herein in its entirety.

What is claimed is:

1. A method for controlling an information processing apparatus that is capable of operating in a firmware update mode for updating a firmware of the information processing apparatus and includes a volatile memory and a battery that supplies power to the volatile memory, the method comprising:

displaying a selecting screen for selecting, by a user, one of a first update method and a second update method, the first update method being a method in which an update firmware is acquired from a first external apparatus with which the information processing apparatus cannot communicate when the information processing apparatus operates in the firmware update mode and the firmware of the information processing apparatus is updated using the acquired update firmware and the second update method being a method in which an update firmware is acquired from a second external apparatus with which the information processing apparatus communicates when the information processing apparatus operates in the firmware update mode and the firmware of the information processing apparatus is updated using the acquired update firmware;

acquiring the update firmware from the first external apparatus before the information processing apparatus transits to the firmware update mode in a case where the first update method is selected via the selecting screen, wherein the acquired update firmware is stored in the volatile memory; and prohibiting an execution of the first update method and permitting an execution of the second update method in a case where a remaining amount of the battery is at or below a threshold, wherein the information processing apparatus connects to the first external apparatus via an internet and connects to the second external apparatus via a universal serial bus (USB) cable.

2. An information processing apparatus being capable of operating in a firmware update mode for updating a firmware of the information processing apparatus, the information processing apparatus comprising;

a volatile memory;

a battery configured to supply power to the volatile memory;

a displaying unit configured to display a selecting screen for selecting, by a user, one of a first update method and a second update method, the first update method being a method in which an update firmware is acquired from a first external apparatus with which the information processing apparatus cannot communicate when the information processing apparatus operates in the firmware update mode and the firmware of the information processing apparatus is updated using the acquired update firmware and the second update method being a method in which an update firmware is acquired from a second external apparatus with which the information processing apparatus communicates when the information processing apparatus operates in the firmware update mode and the firmware of the information processing apparatus is updated using the acquired update firmware;

an acquiring unit configured to acquire the update firmware from the first external apparatus before the information processing apparatus transits to the firmware update mode in a case where the first update method is selected via the selecting screen, wherein the update firmware acquired by the acquiring unit is stored in the volatile memory; and a controlling unit configured to prohibit an execution of the first update method and permit an execution of the second update method in a case where a remaining amount of the battery is at or below a threshold, wherein the information processing apparatus connects to the first external apparatus via an internet and connects to the second external apparatus via a universal serial bus (USB) cable.

3. The information processing apparatus according to claim 1, wherein the controlling unit permits both the execution of the first update method and the execution of the second update method in a case where the remaining amount of the battery exceeds the threshold.

4. The information processing apparatus according to claim 1, wherein the acquiring unit acquires the update firmware from the second external apparatus after the information processing apparatus transits to the firmware update mode in a case where the second update method is selected via the selecting screen, wherein the update firmware acquired by the acquiring unit is stored in the volatile memory.

5. A non-transitory computer-readable storage medium storing a computer program for executing a method for controlling an information processing apparatus that is capable of operating in a firmware update mode for updating a firmware of the information processing apparatus and includes a volatile memory and a battery that supplies power to the volatile memory, the method comprising:

displaying a selecting screen for selecting, by a user, one of a first update method and a second update method, the first update method being a method in which an update firmware is acquired from a first external apparatus with which the information processing apparatus cannot communicate when the information processing apparatus operates in the firmware update mode and the firmware of the information processing apparatus is updated using the acquired update firmware or, a and the second update method being a method in which an update firmware is acquired from a second external apparatus with which the information processing apparatus communicates when the information processing apparatus operates in the firmware update mode and the firmware of the information processing apparatus is updated using the acquired update firmware;

acquiring the update firmware from the first external apparatus before the information processing apparatus transits to the firmware update mode in a case where the first update method is selected via the selecting screen, wherein the acquired update firmware is stored in the volatile memory; and prohibiting an execution of the first update method and permitting an execution of the second update method in a case where a remaining amount of the battery is at or below a threshold, wherein the information processing apparatus connects to the first external apparatus via an internet and connects to the second external apparatus via a universal serial bus (USB) cable.

6. An information processing apparatus acquiring an update firmware and updating a firmware of the information processing apparatus based on the acquired update firmware, the information processing apparatus comprising:

a volatile memory configured to store the acquired update firmware;

a battery configured to supply power to the volatile memory;

a specifying unit configured to specify a remaining amount of the battery;

a displaying unit configured to display a selecting screen in which a user selects a first update method for acquiring the update firmware from a server on an internet or a second update method for acquiring the update firmware from an external apparatus connected with a universal serial bus (USB) cable; and a controlling unit configured to:

permit to update the firmware of the information processing apparatus regardless of the remaining amount of the battery in a case where the user selects the second update method via the selecting screen, permit to update the firmware of the information processing apparatus in a case where the user selects the first update method via the selecting screen and the remaining amount of the battery specified by the specifying unit exceeds a threshold, and prohibit from updating the firmware of the information processing apparatus in a case where the user selects the first update method via the selecting screen and the remaining amount of the battery specified by the specifying unit is at or below a threshold.

7. The information processing apparatus according to claim 6,
wherein the displaying unit displays a message indicating that the remaining amount of the battery is insufficient in a case where the user selects the first update method via the selecting screen and the remaining amount of the battery specified by the specifying unit is at or below a threshold.

8. A method for controlling an information processing apparatus acquiring an update firmware and updating a firmware of the information processing apparatus based on the acquired update firmware and comprising a volatile memory configured to store the acquired update firmware and a battery configured to supply power to the volatile memory, the method comprising:

specifying a remaining amount of the battery;

displaying a selecting screen in which a user selects a first update method for acquiring the update firmware from a server on an internet or a second update method for acquiring the update firmware from an external apparatus connected with a universal serial bus (USB) cable;

permitting to update the firmware of the information processing apparatus regardless of the remaining amount of the battery in a case where the user selects the second update method via the selecting screen;

permitting to update the firmware of the information processing apparatus in a case where the user selects the first update method via the selecting screen and the specified remaining amount of the battery exceeds a threshold; and prohibiting from updating the firmware of the information processing apparatus in a case where the user selects the first update method via the selecting screen and the specified remaining amount of the battery is at or below a threshold.

9. A non-transitory computer-readable storage medium storing a computer program for executing a method for controlling an information processing apparatus acquiring an update firmware and updating a firmware of the information processing apparatus based on the acquired update firmware and comprising a volatile memory configured to store the acquired update firmware and a battery configured to supply power to the volatile memory, the method comprising:

specifying a remaining amount of the battery;

displaying a selecting screen in which a user selects a first update method for acquiring the update firmware from a server on an internet or a second update method for acquiring the update firmware from an external apparatus connected with a universal serial bus (USB) cable;

permitting to update the firmware of the information processing apparatus regardless of the remaining amount of the battery in a case where the user selects the second update method via the selecting screen;

permitting to update the firmware of the information processing apparatus in a case where the user selects the first update method via the selecting screen and the specified remaining amount of the battery exceeds a threshold; and prohibiting from updating the firmware of the information processing apparatus in a case where the user selects the first update method via the selecting screen and the specified remaining amount of the battery is at or below a threshold.

\* \* \* \* \*